United States Patent
Sleasman et al.

(10) Patent No.: US 9,873,443 B2
(45) Date of Patent: Jan. 23, 2018

(54) SYSTEM, METHOD, AND APPARATUS FOR TESTING A TRAIN MANAGEMENT SYSTEM ON A ROAD-RAIL VEHICLE

(71) Applicant: Xorail, LLC, Jacksonville, FL (US)

(72) Inventors: Gregory J. Sleasman, Haverford, PA (US); Matthew Kuryloski, Havertown, PA (US); Pericles Papageorge, Aston, PA (US)

(73) Assignee: Xorail, LLC, Jacksonville, FL (US)

( * ) Notice: Subject to any disclaimer, the term of this patent is extended or adjusted under 35 U.S.C. 154(b) by 0 days.

(21) Appl. No.: 15/189,379

(22) Filed: Jun. 22, 2016

(65) Prior Publication Data

US 2017/0369085 A1 Dec. 28, 2017

(51) Int. Cl.

| | |
|---|---|
| *B60L 1/00* | (2006.01) |
| *G07C 5/00* | (2006.01) |
| *B61L 25/00* | (2006.01) |
| *B61L 27/00* | (2006.01) |
| *B61L 25/02* | (2006.01) |
| *B61L 27/04* | (2006.01) |
| *B60F 1/00* | (2006.01) |
| *G07C 5/08* | (2006.01) |

(52) U.S. Cl.
CPC ............ *B61L 27/0055* (2013.01); *B60F 1/00* (2013.01); *B61L 25/021* (2013.01); *B61L 27/04* (2013.01); *G07C 5/0816* (2013.01)

(58) Field of Classification Search
CPC . B60F 1/00; B61L 25/00; B61L 27/00; G07C 5/00
See application file for complete search history.

(56) References Cited

U.S. PATENT DOCUMENTS

| | | | | |
|---|---|---|---|---|
| 3,764,719 A | * | 10/1973 | Dell .................... | G01S 7/4052 434/2 |
| 3,942,114 A | * | 3/1976 | Keeling .................. | G01P 3/46 246/182 R |
| 4,041,283 A | * | 8/1977 | Mosier ..................... | G09B 9/04 105/61 |
| 4,180,816 A | * | 12/1979 | Endo ........................ | G01S 7/40 342/109 |
| 5,456,604 A | * | 10/1995 | Olmsted ................ | G09B 9/048 434/29 |
| 5,618,179 A | * | 4/1997 | Copperman .......... | A63F 13/005 273/148 B |
| 6,194,850 B1 | * | 2/2001 | Kumar .................. | B60T 8/1705 318/52 |

(Continued)

*Primary Examiner* — Yonel Beaulieu
(74) *Attorney, Agent, or Firm* — The Webb Law Firm

(57) ABSTRACT

A simulation system, device, and method for testing a train management system on a road-rail vehicle is provided. The simulation system includes: a brake pressure simulation device adapted to be connected to a first input of the train management computer, the brake pressure simulation device including at least one circuit configured to output signals representative of at least one brake pipe pressure; and a speed simulation device adapted to be connected to a second input of the train management computer, the speed simulation device configured to detect a speed of the road-rail vehicle and output signals representative of the speed. Also disclosed is a simulation system wherein the at least one circuit of the brake pressure simulation device is configured to have variable resistances.

22 Claims, 14 Drawing Sheets

(56) References Cited

U.S. PATENT DOCUMENTS

| | | | |
|---|---|---|---|
| 6,456,908 B1* | 9/2002 | Kumar | B60L 3/0023 |
| | | | 318/490 |
| 7,095,198 B1* | 8/2006 | O'Brien | G01L 3/242 |
| | | | 318/432 |
| 7,143,017 B2* | 11/2006 | Flynn | B61C 17/12 |
| | | | 434/29 |
| 8,398,405 B2* | 3/2013 | Kumar | B61C 17/12 |
| | | | 434/65 |
| 9,283,945 B1* | 3/2016 | Kernwein | B60T 17/228 |
| 2012/0303237 A1* | 11/2012 | Kumar | B61L 3/006 |
| | | | 701/93 |
| 2017/0096154 A1* | 4/2017 | Hurst | B61L 25/025 |

* cited by examiner

FIG. 13

| CONNECTION TO TMC | | CONNECTION IN BPTS |
|---|---|---|
| EBI 41 F Plug | | D-25 CONNECTION |
| PENALTY SOURCE+ | f | 25 |
| 32V OUTPUT+ | Y | 21 |
| HORN DRIVE 74V | E | 24 |
| 32V OUTPUT- | V | 14 |
| PENALTY SOURCE- | P | 15 |
| HORN MAG VLV DRV | C | 6 |
| HORN 74V RTN | N | 2 |
| CAB SIG CUTOUT+ | D | 22 |
| PEN LOAD + | k | 13 |
| PEN LOAD - | L | 12 |
| 74V RETURN | A | 16 |
| EMER 74V INPUT | J | 23 |
| EMER MAG VALVE | R | 5 |
| DIO 41 F PLUG | | D-15 CONNECTION |
| FORWARD | A | 7 |
| PCS | N | 15 |
| KNIFE SW CLOSED | S | 8 |
| GROUP 1 RTN | V | 11 |
| R | R | 14 |
| DIO D-25 | | |
| BP 1 PRESS+ | 1 | 5 |
| BP 1 PRESS- | 14 | 6 |
| BP 2 PRESS+ | 2 | 9 |
| BP 2 PRESS- | 15 | 1 |
| BC PRESS+ | 3 | 3 |
| BC PRESS- | 16 | 4 |
| EQ RES PRESS+ | 4 | 10 |
| EQ RES PRESS- | 17 | 2 |

1100

SYSTEM, METHOD, AND APPARATUS FOR TESTING A TRAIN MANAGEMENT SYSTEM ON A ROAD-RAIL VEHICLE

BACKGROUND OF THE INVENTION

Field of the Invention

The present invention relates to road-rail vehicles and, in particular, a system, method, and apparatus for testing a train management system on a road-rail vehicle.

Description of Related Art

Trains operating in a track network employ train management systems, e.g., positive train control, to safely and effectively traverse the network. A train management system (TMS) may include, or be operated by, a train management computer (TMC), e.g., an on-board computer or processor. For a TMS to be validated, the TMS first must be tested and calibrated. Testing a TMS may include testing the operations of a TMC. Testing may include initializing the system through a back office system, conducting departure testing, performing critical feature validation, performing wayside interface unit (WIU) verification, and debugging the system as a whole. Initialization, testing, and debugging a TMS after the TMC is installed on a locomotive is a time consuming and expensive process. As part of the locomotive-based testing process, the locomotive must be approved for use, scheduled for use, fueled, manned by a crew, approved by dispatch, and safely operated in the network of other trains and locomotives. If issues arise during the testing of a TMS, the locomotive must be halted or removed from the track to allow the problems to be addressed. Because of these costly procedures, it is desirable to perform critical feature validation, WIU verification, and system debugging without the use of a locomotive. For instances where it is too expensive or impractical to use a locomotive, certain safety-critical aspects of a TMS can be performed by using a road-rail vehicle, e.g., a hyrail vehicle, equipped with a TMC.

Currently, railroads test train management systems by using road-rail vehicles that are specially purposed and have a TMC built into the truck bed or trunk of the vehicle. However, such specially equipped trucks are expensive and railroads cannot easily adapt existing road-rail vehicles.

SUMMARY OF THE INVENTION

Generally, provided are an improved system, method, and apparatus for testing a train management system on a road-rail vehicle.

According to one preferred and non-limiting embodiment or aspect, provided is a system for simulating a train management system on a road-rail vehicle, comprising: at least one portable enclosure; a power source disposed in the at least one portable enclosure; and a train management computer disposed in the at least one portable enclosure, the train management computer adapted to be connected to the power source.

In non-limiting embodiments or aspects, the at least one portable enclosure may include a first portable enclosure and a second portable enclosure, wherein the power source is disposed in the first portable enclosure, and wherein the train management computer is in the second portable enclosure. Further, the system may include a power connector adapted to connect the power source to the train management computer. In some examples, the first enclosure may comprise a first exterior interface adapted to connect the power source to a first end of the power connector, and the second enclosure may comprise a second exterior interface adapted to connect the power source to a second end of the power connector. Further, a wireless network interface may be disposed in the at least one portable enclosure and in communication with the train management computer.

In non-limiting embodiments or aspects, the system may further include at least one computer-readable medium comprising program instructions that, when executed by at least one processor, causes the at least one processor to generate at least one user interface on a portable computer in communication with the train management computer via the wireless network interface, the at least one user interface configured to control or operate the train management computer. The system may also include a portable computer in wireless communication with the train management computer, the portable computer programmed or configured to emulate a cab display unit.

Additionally, in non-limiting embodiments or aspects, the system may include at least one circuit programmed or configured to generate signals simulating at least two different brake pipe pressures. The system may also include a speed sensor configured to generate signals based on a speed of the road-rail vehicle and to simulate an output of a wheel tachometer, a cab display unit disposed in the at least one portable enclosure, and a data radio in communication with the train management computer. The power source of the system may include at least one battery, and the system may further comprise at least one regulator in communication with the at least one battery and configured to convert power from the at least one battery to a power input to the train management computer.

According to another preferred and non-limiting embodiment or aspect, provided is a portable train management system for testing on a road-rail vehicle, comprising: at least one portable enclosure; a train management computer arranged in the at least one enclosure; and at least one circuit arranged in the at least one enclosure and in communication with the train management computer, the at least one circuit programmed or configured to: generate signals simulating at least two different brake pipe pressures, generate signals simulating an output of a wheel tachometer based on a speed sensor, or any combination thereof.

In non-limiting embodiments or aspects, the system may further include a power source arranged in the at least one portable enclosure. Further, the at least one portable enclosure may include a first portable enclosure and a second portable enclosure. The train management computer and the at least one circuit may be positioned in the first portable enclosure and the power source is positioned in the second portable enclosure. The system may also include a computer-readable medium comprising program instructions that, when executed by at least one processor, cause the at least one processor to emulate a cab display unit on a portable computer in wireless communication with the train management computer.

According to a further preferred and non-limiting embodiment or aspect, provided is a method for testing a train management system on a road-rail vehicle, comprising: placing at least one portable enclosure on or in the road-rail vehicle, the at least one portable enclosure comprising a train management computer and a power source; connecting the train management computer to the power source; establishing a wireless connection between the train management computer and at least one portable computer; and testing, using the at least one portable computer, at least one function of the train management computer while the road-rail vehicle is in motion.

In non-limiting embodiments or aspects, the at least one portable enclosure may comprise a first portable enclosure and a second portable enclosure, wherein the power source is disposed in the first portable enclosure, and wherein the train management computer is disposed in the second portable enclosure. At least one of the first portable enclosure and the second portable enclosure may comprise an exterior interface. The method may further comprise connecting the first portable enclosure and the second portable enclosure with a cable and the exterior interface. The method may further comprise arranging a speed sensor on the road-rail vehicle and establishing a connection between the speed sensor and the train management computer.

According to a further preferred and non-limiting embodiment or aspect, provided is a simulation system for testing a train management system including a train management computer on a road-rail vehicle, the simulation system comprising: a train management computer positioned on or in the road-rail vehicle; a brake pressure simulation device adapted to be connected to a first input of the train management computer, the brake pressure simulation device comprising at least one circuit programmed or configured to output signals representative of at least one brake pipe pressure; and a speed simulation device adapted to be connected to a second input of the train management computer, the speed simulation device programmed or configured to detect a speed of the road-rail vehicle and output signals representative of the speed.

In non-limiting embodiments or aspects, the at least one circuit may have a variable resistance such that the signals representative of the at least one brake pipe pressure comprise at least two resistances. Further, the brake pressure simulation device may comprise an input interface adapted to receive output signals from the train management computer, and the at least one circuit may be programmed or configured to change in resistance based at least partially on the output signals.

In non-limiting embodiments or aspects, the resistance of the at least one circuit may be programmed or configured to switch between a higher-level resistance and a lower-level resistance. The higher-level resistance may be representative of a lower-level brake pipe pressure that occurs during brake application, and the lower-level resistance may be representative of a higher-level brake pipe pressure that occurs during brake release.

In non-limiting embodiments or aspects, the speed simulation device may comprise a radar speed sensor. In some examples, the speed simulation device may comprise a wheel speed tachometer for the road-rail vehicle. Further, the speed simulation device may comprise a signal converter configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

In non-limiting embodiments or aspects, the first input may comprise an electronic brake interface. In some examples, the first input may comprise a discrete input/output interface. Further, the second input may comprise a discrete input/output interface. In non-limiting embodiments or aspects, the speed simulation device may be programmed or configured to detect a speed of the road-rail vehicle by detecting a speed of a ground surface relative to the road-rail vehicle as the road-rail vehicle is moving. The speed simulation device may be programmed or configured to produce a pulsing signal wave simulative of the output of a wheel speed tachometer, wherein the signal's pulse rate changes in relation to the road-rail vehicle's ground speed.

In non-limiting embodiments or aspects, the simulation system may further comprise a vent pressure simulation device, the vent pressure simulation device comprising an air pressure transducer configured to output a signal representative of a zero pressure.

According to a further preferred and non-limiting embodiment or aspect, provided is a simulation device for testing a train management system on a road-rail vehicle, the simulation device comprising: at least one first interface adapted to be connected to a brake system input of a train management computer; at least one second interface adapted to be connected to a speed input of the train management computer; a brake pressure simulation circuit programmed or configured to generate and output at least one brake pressure signal through the at least one first interface; and a speed simulation circuit programmed or configured to output at least one speed signal through the at least one second interface, the at least one speed signal representing a speed of the road-rail vehicle.

In non-limiting embodiments or aspects, the speed simulation circuit may comprise: at least one speed sensor configured to detect the speed of the road-rail vehicle; and at least one circuit or processor programmed or configured to convert at least one signal received from the at least one speed sensor to the at least one speed signal. The speed simulation circuit may be a signal converter programmed or configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

In non-limiting embodiments or aspects, the speed simulation circuit may be programmed or configured to generate at least one speed signal based at least partially on the speed of the road-rail vehicle. The speed simulation sensor may be a ground speed radar. In some examples, the speed simulation sensor may be a wheel speed tachometer for the road-rail vehicle.

According to a further preferred and non-limiting embodiment or aspect, provided is a method for testing a train management system including a train management computer on a road-rail vehicle, the method comprising: generating, with at least one circuit, at least one brake pressure signal based at least partially on at least one signal received from the train management computer; outputting the at least one brake pressure signal to an input of the train management computer; detecting at least one speed of the road-rail vehicle while the road-rail vehicle is moving; generating at least one speed signal based at least partially on the at least one speed of the road-rail vehicle; and outputting the at least one speed signal to the train management computer.

In non-limiting embodiments or aspects, the method may further comprise varying the at least one brake pressure signal by varying the resistance of the at least one circuit, at least partially in response to the input of the train management computer. The resistance of the at least one circuit may be configured to switch between a higher-level resistance, representative of a lower-level brake pipe pressure that occurs during brake application, and a lower-level resistance, representative of a higher-level brake pipe pressure that occurs during brake release.

Further preferred and non-limiting embodiments or aspects are set forth in the following numbered clauses.

Clause 1: A simulation system for testing a train management system comprising a train management computer on a road-rail vehicle, the simulation system comprising: a brake pressure simulation device adapted to be connected to a first input of the train management computer, the brake pressure simulation device comprising at least one circuit programmed or configured to output signals representative of at least one brake pipe pressure; and a speed simulation device adapted to be connected to a second input of the train management computer, the speed simulation device programmed or configured to detect a speed of the road-rail vehicle and output signals representative of the speed.

Clause 2: The simulation system of clause 1, wherein the at least one circuit has a variable resistance such that the signals representative of the at least one brake pipe pressure comprise at least two resistances.

Clause 3: The simulation system of clause 1 or 2, wherein the brake pressure simulation device comprises an input interface adapted to receive output signals from the train management computer, and wherein the at least one circuit is programmed or configured to change in resistance based at least partially on the output signals.

Clause 4: The simulation system of any of clauses 1-3, wherein the resistance of the at least one circuit is programmed or configured to switch between a higher-level resistance and a lower-level resistance, wherein the higher-level resistance is representative of a lower-level brake pipe pressure that occurs during brake application, and wherein the lower-level resistance is representative of a higher-level brake pipe pressure that occurs during brake release.

Clause 5: The simulation system of any of clauses 1-4, wherein the speed simulation device comprises a radar speed sensor.

Clause 6: The simulation system of any of clauses 1-5, wherein the speed simulation device comprises a wheel speed tachometer for the road-rail vehicle.

Clause 7: The simulation system of any of clauses 1-6, wherein the speed simulation device comprises a signal converter programmed or configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

Clause 8: The simulation system of any of clauses 1-7, wherein the first input comprises an electronic brake interface.

Clause 9: The simulation system of any of clauses 1-8, wherein the first input comprises a discrete input/output interface.

Clause 10: The simulation system of any of clauses 1-9, wherein the second input comprises a discrete input/output interface.

Clause 11: The simulation system of any of clauses 1-10, wherein the speed simulation device is programmed or configured to detect a speed of the road-rail vehicle by detecting a speed of a ground surface relative to the road-rail vehicle as the road-rail vehicle is moving.

Clause 12: The simulation system of any of clauses 1-11, wherein the speed simulation device is programmed or configured to produce a pulsing signal wave simulative of the output of a wheel speed tachometer, wherein the signal's pulse rate changes in relation to the road-rail vehicle's ground speed.

Clause 13: The simulation system of any of clauses 1-12, further comprising a vent pressure simulation device, the vent pressure simulation device comprising an air pressure transducer configured to output a signal representative of a zero pressure.

Clause 14: A simulation device for testing a train management system on a road-rail vehicle, the simulation device comprising: at least one first interface adapted to be connected to a brake system input of a train management computer; at least one second interface adapted to be connected to a speed input of the train management computer; a brake pressure simulation circuit programmed or configured to generate and output at least one brake pressure signal through the at least one first interface; and a speed simulation circuit programmed or configured to output at least one speed signal through the at least one second interface, the at least one speed signal representing a speed of the road-rail vehicle.

Clause 15: The simulation device of clause 14, wherein the speed simulation circuit comprises: at least one speed sensor configured to detect the speed of the road-rail vehicle; and at least one circuit or processor programmed or configured to convert at least one signal received from the at least one speed sensor to the at least one speed signal.

Clause 16. The simulation device of clause 14 or 15, wherein the speed simulation circuit is a signal converter programmed or configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

Clause 17: The simulation device of any of clauses 14-16, wherein the speed simulation circuit is programmed or configured to generate at least one speed signal based at least partially on the speed of the road-rail vehicle.

Clause 18: The simulation device of any of clauses 14-17, wherein the speed simulation sensor is a ground speed radar.

Clause 19: The simulation device of any of clauses 14-18, wherein the speed simulation sensor is a wheel speed tachometer for the road-rail vehicle.

Clause 20: A method for testing a train management system comprising a train management computer on a road-rail vehicle, the method comprising: generating, with at least one circuit, at least one brake pressure signal based at least partially on at least one signal received from the train management computer; outputting the at least one brake pressure signal to an input of the train management computer; detecting at least one speed of the road-rail vehicle while the road-rail vehicle is moving; generating at least one speed signal based at least partially on the at least one speed of the road-rail vehicle; and outputting the at least one speed signal to the train management computer.

Clause 21: The method of clause 20, further comprising: varying the at least one brake pressure signal by varying the resistance of the at least one circuit, at least partially in response to the input of the train management computer.

Clause 22: The method of clause 20 or 21, wherein the resistance of the at least one circuit is configured to switch between a higher-level resistance, representative of a lower-level brake pipe pressure that occurs during brake application, and a lower-level resistance, representative of a higher-level brake pipe pressure that occurs during brake release.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 13 is a schematic diagram of input/output connections for a train management computer for connecting to the circuit shown in FIGS. 11 and 12 according to the principles of the present invention;

DETAILED DESCRIPTION OF THE INVENTION

Figure 1:
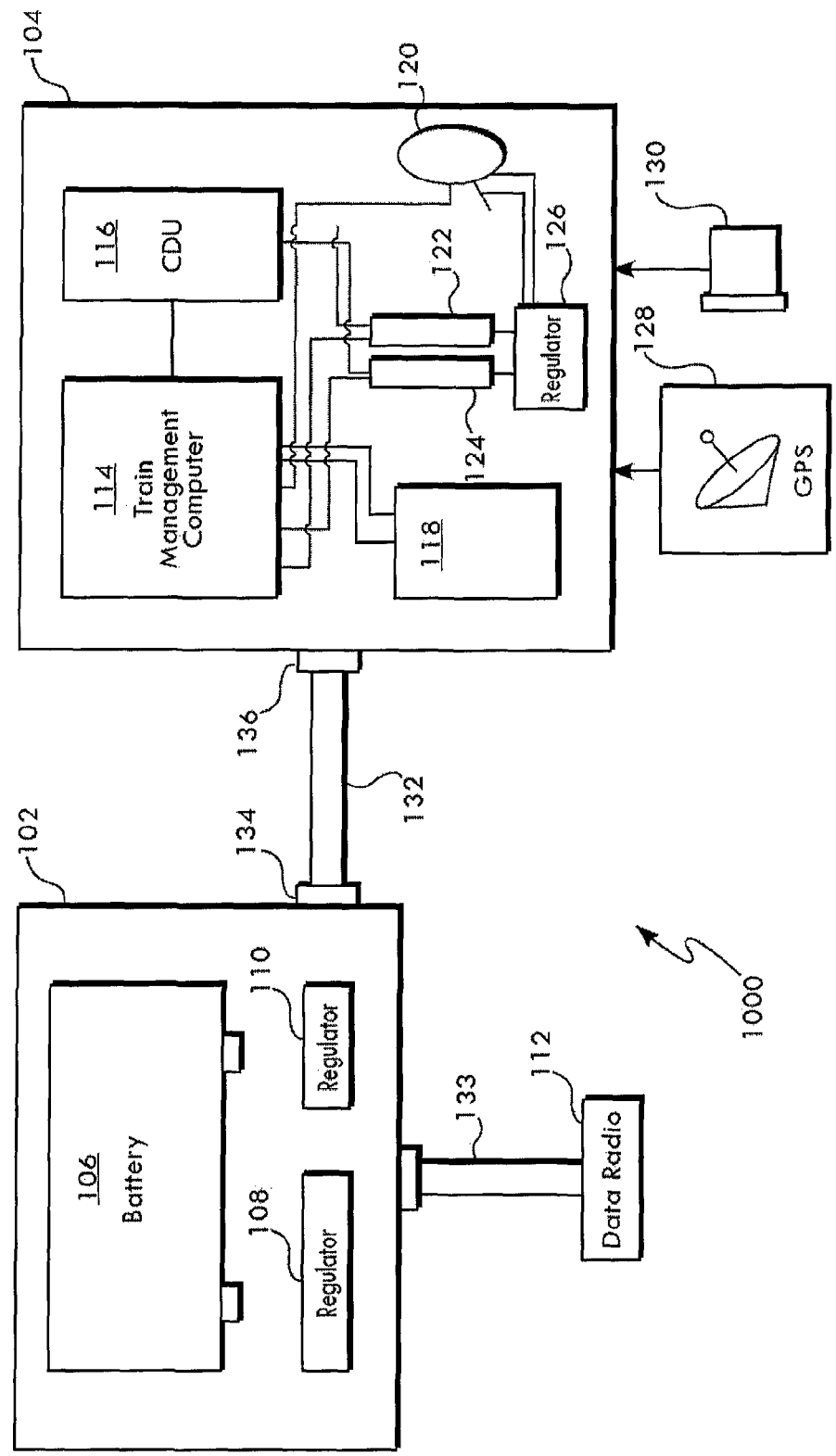
FIG. 1 illustrates a schematic diagram of a non-limiting embodiment or aspect of a system for testing a train management system on a road-rail vehicle according to the principles of the present invention.

For purposes of the description hereinafter, the terms "upper", "lower", "right", "left", "vertical", "horizontal", "top", "bottom", "lateral", "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like.

In a preferred and non-limiting embodiment or aspect of the present invention, provided is a system, method, and apparatus for testing a train management system (TMS), e.g., a positive train control system, on an existing road-rail vehicle. A train management system (TMS) may include, or be operated by, a train management computer (TMC), e.g., an on-board computer or processor. The present invention allows for existing vehicles to be retrofitted and/or configured for testing purposes using portable enclosures. In particular, one or more portable enclosures contain the components necessary to perform such testing and can be easily moved from one road-rail vehicle to another. In a preferred and non-limiting embodiment or aspect, two portable enclosures are used and connected together on a road-rail vehicle to simulate a TMC operating on a locomotive. Non-limiting embodiments or aspects of the present invention simulate a TMC on a locomotive and are used on an ordinary road-rail vehicle for critical feature validation, wayside interface unit input/output verification, route testing, database (e.g., subdiv file) troubleshooting, network troubleshooting, and other testing and/or debugging of TMC functions. For example, the TMC may be used to perform an initialization, to perform a departure test, to enforce braking penalties, and/or to receive messages from WIUs and/or a back office system.

Referring to FIG. 1, a system 1000 for testing a TMS on a road-rail vehicle is shown according to a preferred and non-limiting embodiment or aspect. A first portable enclosure 102 houses a power supply 106 and power regulators 108, 110. A second portable enclosure 104 houses a TMC 114, a cab display unit (CDU) 116, a wireless network interface 120, a brake pipe and tachometer simulation subsystem 118, a bus 122, a bus ground 124, and a power regulator 126. It will be appreciated that the brake pipe and tachometer simulation subsystem 118 may also be implemented independently of the portable enclosures 102, 104. Although FIG. 1 illustrates two portable enclosures 102, 104, it will be appreciated that, in some non-limiting embodiments or aspects, a single portable enclosure 104 may be used to house all or some of the components. In further non-limiting embodiments or aspects, the components of the system 1000 may be distributed among any number of portable enclosures. It will be appreciated that various components and arrangements of components may be used.

With continued reference to FIG. 1, in a preferred and non-limiting embodiment or aspect, the portable enclosures 102, 104 are protective cases adapted to withstand an impact, crash, or other like event. As an example, the portable enclosures 102, 104 may include a hardened plastic, metal, or rubber exterior, and a padded interior. It will be appreciated, however, that various materials may be used to protect the contents of the enclosures 102, 104. Moreover, in some non-limiting embodiments or aspects, only the second portable enclosure 104 may be a protective case, and the first portable enclosure 102 may be a different type of enclosure that is not necessarily protective. In further non-limiting embodiments or aspects, neither portable enclosure 102, 104 may be protective. Other arrangements are possible.

In non-limiting embodiments or aspects, one or both portable enclosures 102, 104 may include a carrying arrangement (not shown in FIG. 1), such as, but not limited to, one or more handles, straps, protrusions, or other features or devices for gripping or carrying the enclosures 102, 104. The carrying arrangement may be permanently fixed to the enclosures 102, 104 or may be removable. One or both portable enclosures 102, 104 may also include a conveyance mechanism, such as but not limited to one or more wheels, to allow for the enclosures 102, 104 to be easily transported to a testing site.

With continued reference to FIG. 1, the first and second enclosures 102, 104 may include one or more exterior interfaces 134, 136. The exterior interfaces 134, 136 may be configured to allow for a physical connection to be made between the first and second enclosures 102, 104. In a preferred and non-limiting embodiment or aspect, the power source 106 in the first enclosure 102 may be connected to the second enclosure 104 via the interfaces 134, 136 to supply power to the TMC 114 and other components. The connection between interfaces 134, 136 may be made with a power connector 132, such as a cable. It will be appreciated that, in some non-limiting embodiments or aspects, only one of the enclosures 102, 104 may have an exterior interface 134, 136 and the power connector 132 may permanently extend from the other enclosure 102, 104. In other examples, the power connector 132 may be connected directly or indirectly to one or more components within the first enclosure 102 and/or second enclosure 104.

Still referring to FIG. 1, the system 1000 also includes a communication device, such as a data radio 112, a positioning system, such as a GPS receiver 128, and a speed sensor 130. The data ratio 112, speed sensor 130, and/or GPS receiver 128 may be external to the enclosures 102, 104, as shown in FIG. 1, or in other embodiments or aspects may be disposed within one of the enclosures 102, 104. Another power connector 133 may be used to provide power from the power source 106 to the data radio 112. The GPS receiver 128 and/or speed sensor 130 may also be provided with power via one or more power connectors directly from the power source 106 or indirectly from a power regulator 126 in the second enclosure 104. In a preferred and non-limiting embodiment or aspect, the data radio 112 is a 220 megahertz (MHz) band locomotive data radio that is used to provide wireless communication between the TMC and a positive train control (PTC) system and/or Interoperable Train Control Messaging (ITCM) network. For example, the data radio 112 may facilitate communication between the TMC and a back office system and/or WIU. For testing purposes, the data radio 112 may be used to perform WIU and route verification. It will be appreciated that various other arrangements are possible.

In a preferred and non-limiting embodiment or aspect, the speed sensor 130 is a radar sensor that measures the speed of the vehicle by directing radar signals to the ground and detecting a change in frequency of a returned radar signal caused by the Doppler effect. However, it will be appreciated that any suitable type of speed sensor may be used. For example, a Lidar device may be used to sense the speed of the vehicle by transmitting pulsed laser light. In other non-limiting embodiments or aspects, the speed sensor 130 may be an axle counter, driveshaft rotation sensor, and/or wheel tachometer that measures the speed of the road-rail vehicle. In further non-limiting embodiments or aspects, the speed sensor 130 may simply interface with an existing speedometer on the road-rail vehicle and output signals that are receivable by the TMC 114.

With continued reference to FIG. 1, in a preferred and non-limiting embodiment or aspect the power source 106 may be a 12 volt (V) battery with 130 ampere (A) hours. The power source 106 may be chargeable while in the portable enclosure 102 via one or more interfaces 134. It will be appreciated that various other types of batteries and power sources may be used. In non-limiting embodiments or aspects, the power source 106 may be an existing power source of the road-rail vehicle. The first portable enclosure 102 may include one or more power regulators 108, 110 for outputting power from the battery. In a preferred and non-limiting embodiment or aspect, the first portable enclosure 102 includes a first power regulator 108 (e.g., a 12 to 74 V regulator) to provide power to the data radio 112 and a second power regulator 110 (e.g., a 12 to 13.8 V regulator) to provide power to the TMC 114. It will be appreciated that any type of power regulator may be used based on the type of power source 106 and/or the type of device that needs a power supply. Moreover, the first portable enclosure 102 may also include a circuit breaker, such as but not limited to a 30 amperage circuit breaker (not shown in FIG. 1), between the power source 106 and one or more of the regulators 108, 110. The circuit breaker may remain open when the system 1000 is not in use and, prior to use, a user can close the circuit breaker and turn on the regulators 108, 110.

Still referring to FIG. 1, the second portable enclosure 104 may include a cab display unit (CDU) 116. Although a CDU 116 is typically used to visually display information to the operator of a train, including a CDU 116 in the system 1000 allows the TMC 114 to recognize a CDU 116 connection and therefore operate as it would in a locomotive. It will be appreciated, however, that a device to simulate a CDU 116 may also be used and that, in some examples, the TMC 114 may be specially configured to make the CDU 116 unnecessary. In further non-limiting embodiments or aspects, the CDU 116 may be fully or partially external to the portable enclosure 104 such that it can be seen even when the enclosure 104 is in a closed position.

The second portable enclosure 104 may also include a wireless network adapter 120 to facilitate wireless communication between the TMC 114, CDU 116, brake pipe and tachometer simulation subsystem 118, and/or any other components of the system 1000 with laptops, mobile devices, in-dash computers, and other external computing devices. In a preferred and non-limiting embodiment or aspect, the wireless network adapter 120 may include a router to serve as a wireless access point and to assign unique addresses to connected devices. The wireless network adapter 120 may also accept wired connections, and the TMC 114 may interface with the adapter 120 either wirelessly or via a physical connection (e.g., USB, Ethernet, or the like). In some non-limiting embodiments or aspects, the wireless network adapter 120 may also include a gateway for connecting to external wireless networks such as a cellular data network. In other non-limiting embodiments or aspects, instead of the system 1000 including the wireless network adapter 120 in one of the enclosures 102, 104, a portable wireless network access point external to the system 1000 may be used to connect the TMC 114 and/or other system components to one or more external, computing devices.

Figure 2:
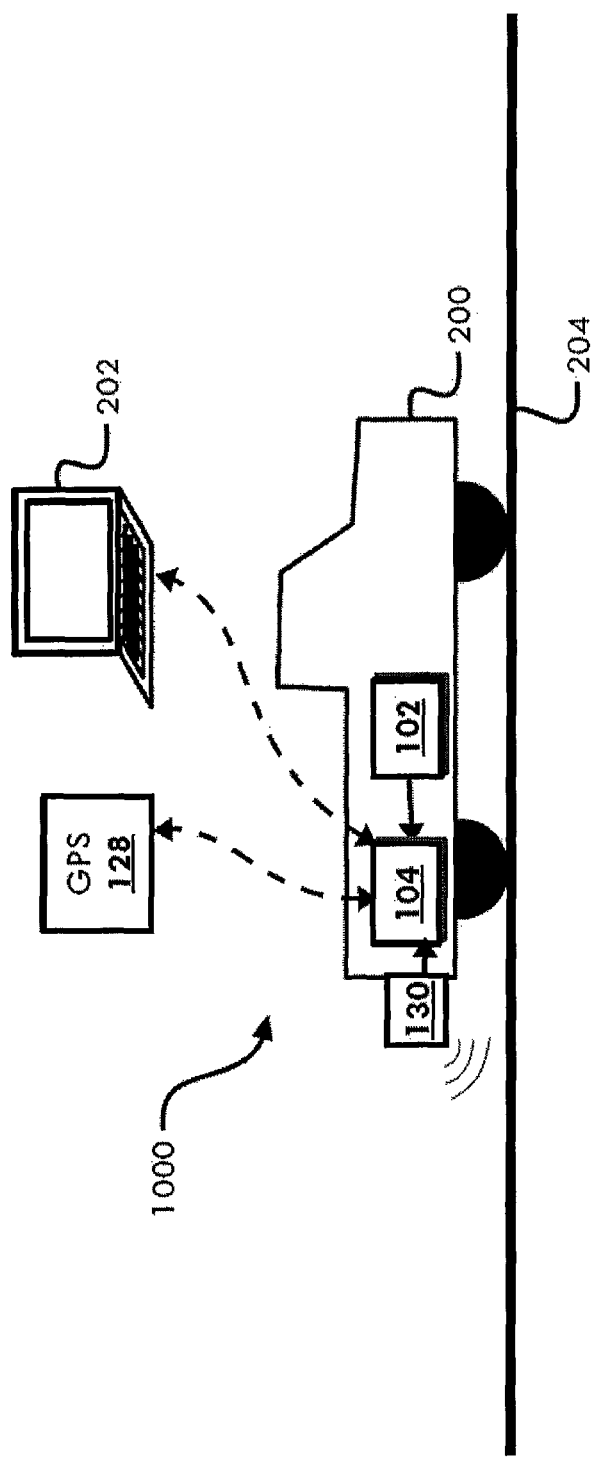
FIG. 2 illustrates another schematic diagram of a non-limiting embodiment or aspect of a system for testing a train management system on a road-rail vehicle according to the principles of the present invention.

Referring now to FIG. 2, a system 1000 for testing a TMS on a road-rail vehicle 200 is shown according to a preferred and non-limiting embodiment or aspect. A road-rail vehicle 200 is equipped with two portable enclosures 102, 104 and is traveling on a railway 204. The two portable enclosures 102, 104 are connected so that power is provided from a power supply (not shown in FIG. 2) within the first portable enclosure 102 to the TMC (not shown in FIG. 2) within the second portable enclosure 104. The TMC in the second portable enclosure 104 is in wireless communication with a portable computer 202, such as a laptop, an in-dash computer built into the road-rail vehicle 200, a smartphone, and/or a tablet computer. The TMC is also in wired or wireless communication with a GPS receiver 128 and speed sensor 130.

In a preferred and non-limiting embodiment or aspect and still referring to FIG. 2, the portable computer 202 is equipped with one or more software applications programmed or configured to interact with the TMC 114 (not shown in FIG. 2). For example, the portable computer 202 may be equipped with display server software that remotely reproduces the display of and/or emulates the CDU (not shown). In some non-limiting embodiments or aspects, the portable computer 202 may replace the CDU entirely. In other non-limiting examples, the portable computer 202 may be equipped with one or more software applications that generate separate interfaces for interacting with the TMC.

Figure 3:
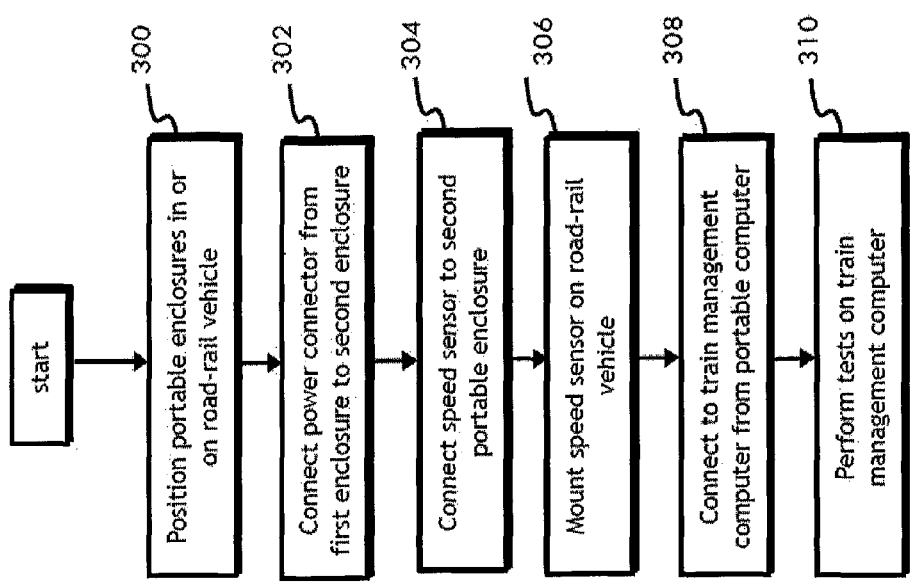
FIG. 3 illustrates a step diagram of a non-limiting embodiment or aspect of a method for testing a train management system on a road-rail vehicle according to the principles of the present invention.

Referring now to FIG. 3, a flow diagram for testing a TMS on a road-rail vehicle is shown according to a preferred and non-limiting embodiment or aspect. At a first step 300, one or more portable enclosures are positioned in or on a road-rail vehicle. Next, at step 302, a power connector is used to connect a power source to a TMC in one of the enclosures. As discussed herein, the power source may be in another enclosure, may be in the same enclosure as the TMC, or may be external to an enclosure. At step 304, a speed sensor is connected to the TMC in the enclosure. The speed sensor may be a radar sensor, although various other devices may be used to measure the speed of the road-rail vehicle and/or output signals representative of a speed that are receivable by the TMC. Next, at step 306, the speed sensor is mounted on the road-rail vehicle. At step 308, a user connects a portable computer to the TMC. Finally, at step 310, a user performs tests on the TMC through the portable computer. Tests may include, for example, an initialization, a departure test, an enforcement of braking penalties, and/or communication with a WIU and/or back office system.

Referring again to FIG. 1, the system 1000 includes a brake pipe and tachometer simulation subsystem 118 for simulating brake pipe pressure and speed inputs of a TMC 114. The TMC 114 may include at least one input for a brake pipe pressure and at least one input for a wheel tachometer to respectively receive current values of the brake pressure and vehicle speed. In a preferred and non-limiting embodiment or aspect, the brake pipe and tachometer simulation subsystem 118 comprises a brake pipe pressure simulation device and a speed simulation device. It will be appreciated to those skilled in the art that the brake pipe pressure simulation device and speed simulation device may comprise one singular device that generates simulated brake pipe pressure and speed signals or, in other examples, may include separate and independent devices. Further, the brake pipe and tachometer simulation subsystem 118 may include one or more housings and, in other non-limiting examples, may not have any housing and the components of which may be disposed within one of the portable enclosures 102, 104. Various other arrangements are possible.

Figure 4:
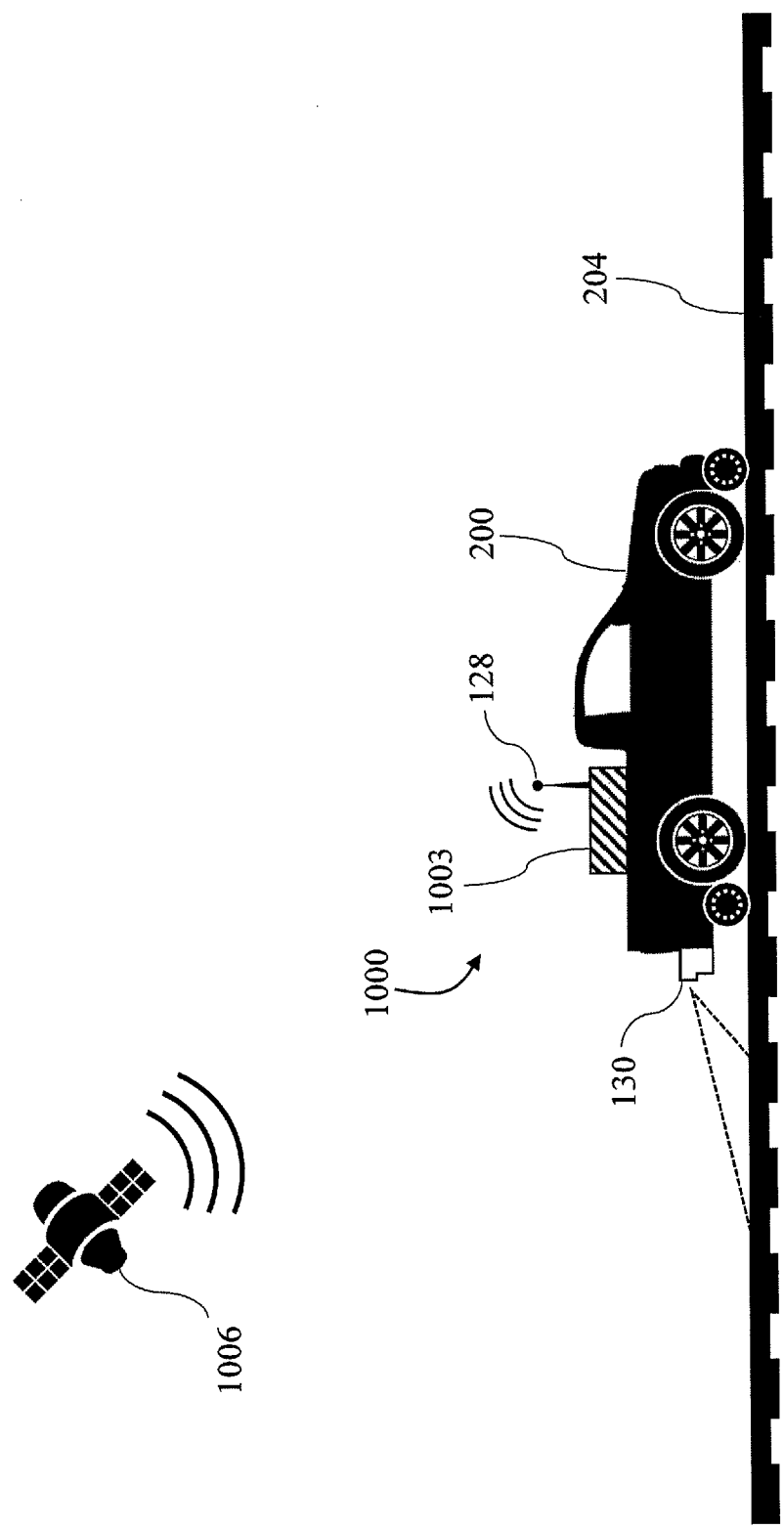
FIG. 4 is a schematic view of a non-limiting embodiment or aspect of a system for simulating brake pipe pressure and speed signals for a train management computer disposed on a road-rail vehicle according to the principles of the present invention.

Referring now to FIG. 4, a system 1000 for testing a TMS on a road-rail vehicle 200 is shown according to a preferred and non-limiting embodiment or aspect. Depicted is an example simulation using a road-rail vehicle 200 on a set of railroad tracks 204. The road-rail vehicle 200 is equipped with one or more portable enclosures 1003. The system 1000, as described herein, includes a TMC and a brake pipe and tachometer simulation subsystem disposed within the one or more portable enclosures 1003. In the preferred and non-limiting embodiment or aspect shown in FIG. 4, the speed sensor 130 is a ground speed radar sensor mounted on the tail hitch of the road-rail vehicle 200, angularly aimed at the surface below and behind the vehicle 200. It will be appreciated that the speed sensor 130 may be placed in other positions on the vehicle, such as on the front grille, in the undercarriage, on a running board, on the roof of the vehicle, or any other position where the sensor may obtain accurate speed readings of the passing terrain or tracks.

Also depicted in FIG. 4 is a GPS receiver 128 in communication with a GPS satellite 1006 that is used as a redundant speed sensor to verify the readings of the speed sensor 130. It will be appreciated that, in some non-limiting embodiments or aspects, the GPS receiver 128 may not be used to detect the speed of the vehicle 200 and, in other non-limiting embodiments or aspects, the GPS receiver 128 may be used instead of the speed sensor 130. Further, the GPS receiver 128 may be used to determine the vehicle's location for other verification, track-positioning, and/or motion-tracking processes. The GPS receiver 128 may be located anywhere in or on the vehicle 200. It will be appreciated that various other arrangements are possible.

Figures 5A, 5B:
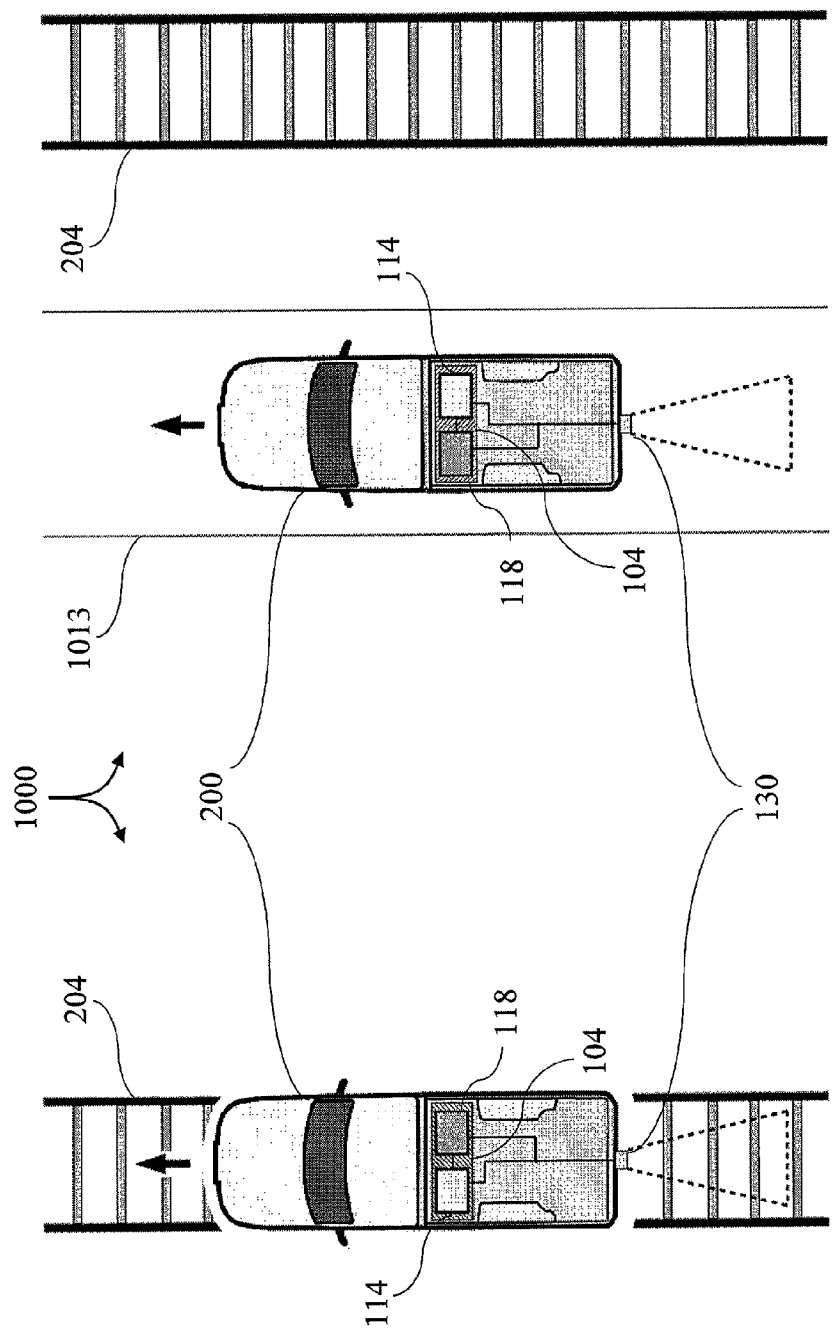
FIG. 5A is a schematic view of a non-limiting embodiment or aspect of a system for simulating brake pipe pressure and speed signals for a train management computer disposed on a road-rail vehicle driving on a set of railroad tracks according to the principles of the present invention.
FIG. 5B is a schematic view of another non-limiting embodiment or aspect for simulating brake pipe pressure and speed signals for a train management computer disposed on a road-rail vehicle driving adjacent to a set of railroad tracks according to the principles of the present invention.

Referring now to FIG. 5A, a system 1000 for testing a TMS on a road-rail vehicle 200 is shown according to a preferred and non-limiting embodiment or aspect. In FIG. 5A, the road-rail vehicle 200 is shown traveling on a track 204. As shown, the TMC 114 is disposed in the portable enclosure 104 and is communicatively connected to the brake pipe and tachometer simulation subsystem 118, which is also disposed in the portable enclosure 104. The TMC 114 is further communicatively connected to the speed sensor 130, which in this embodiment or aspect is depicted to include a rear-mounted ground speed radar sensor. As the road-rail vehicle 200 proceeds down the railroad tracks 204, the brake pipe and tachometer simulation subsystem 118 provides simulated inputs of locomotive hardware for the TMC 114, including signals representative of brake pipe pressure, so that the TMC 114 may be initialized and tested in a manner that simulates TMC deployment on a train.

Still referring to FIG. 5A, the brake pipe and tachometer simulation subsystem 118 further simulates the hardware input of a locomotive wheel speed tachometer so that speed-related testing can be completed. In a preferred and non-limiting embodiment or aspect, the speed sensor 130 is connected to a speed simulation device that may be part of the brake pipe and tachometer simulation subsystem 118, which is in turn connected to the TMC 114. In other non-limiting embodiments or aspects, the speed sensor 130 may be configured to output signals that simulate the output signals of a wheel tachometer and can therefore be connected directly to a hardware input of the TMC 114. It will be appreciated that the speed sensor 130 and/or brake pipe and tachometer simulation subsystem 118 may condition and/or convert the output signals to simulate output signals of a wheel tachometer.

Referring now to FIG. 5B, the system 1000 is shown with the road-rail vehicle on a roadway 1013 adjacent a track 204. For tests that involve determining the position of a locomotive on a track, a GPS unit may be employed and an offset can be applied to the position of the road-rail vehicle 200 to approximate the road-rail vehicle's simulated position on the nearby railroad tracks 204.

Figure 6:
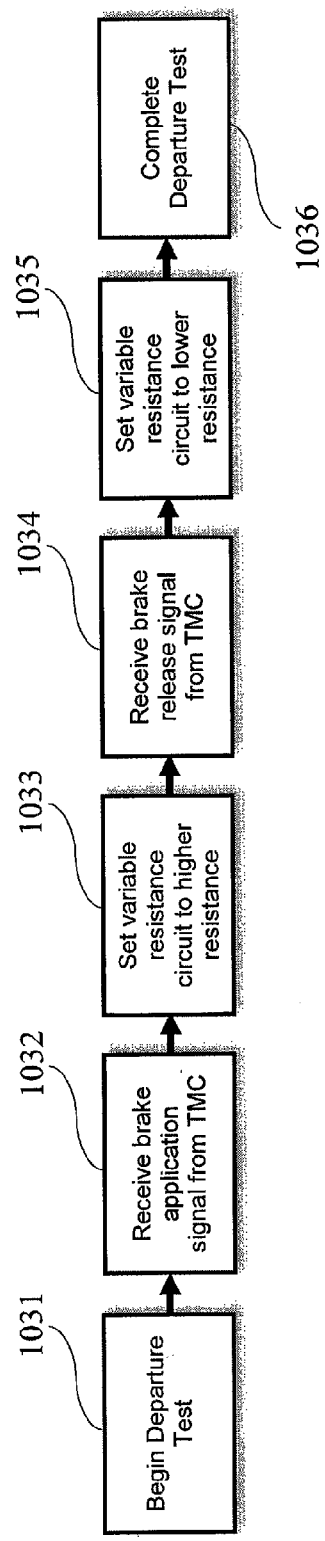
FIG. 6 is a flow diagram of a non-limiting embodiment or aspect of a brake pipe pressure validation method and initialization process for testing a train management computer disposed on a road-rail vehicle according to the principles of the present invention.

With reference to FIG. 6, a method for testing a TMC on a road-rail vehicle is shown according to a non-limiting embodiment or aspect. The brake pipe simulation device is configured to receive signals from the TMC and simulate the hardware inputs of a locomotive. First, the brake pipe simulation device begins its initialization process, e.g., a departure test, at step 1031, which may include verifying connection to the TMC as well as executing steps 1032-1035. The brake pipe simulation device receives a signal from the TMC indicating or commanding a brake application at step 1032. In this embodiment or aspect, the TMC is programmed or configured to interpret a locomotive brake pipe pressure as levels of resistance. The brake pipe simulation device is programmed or configured with at least one variable resistance circuit, and in response to the brake application signal, the brake pipe simulation device sets its variable resistance circuit to a higher resistance at step 1033. For example, a TMC may interpret input resistance of 3.4 kΩ as approximately 4 psi in brake pipe pressure, which is the approximate brake pipe pressure when brakes of a train are fully applied. It will be appreciated that such interpretations may vary among different makes and/or models of TMCs. The TMC would likewise interpret a high resistance input from the brake pipe simulation device as a drop in brake pipe pressure commensurate with an application of brakes. Next, the brake pipe simulation device receives a signal from the TMC indicating or commanding a brake release at step 1034. In response to the brake release signal, the brake pipe simulation device sets its variable resistance circuit to a lower resistance at step 1035. An example TMC may interpret input resistance of 1 kΩ as approximately 90 psi in brake pipe pressure, which is the approximate brake pipe pressure when brakes of a train are not being applied. Again, different makes and/or models of TMCs may differ in how resistances are interpreted. The TMC would likewise interpret a low resistance input as a raise in brake pipe pressure commensurate with a brake release. The TMC verifies the brake pipe simulation device inputs as a successfully completed brake application test, and the brake pipe simulation device initialization is complete at step 1036.

Figure 7:
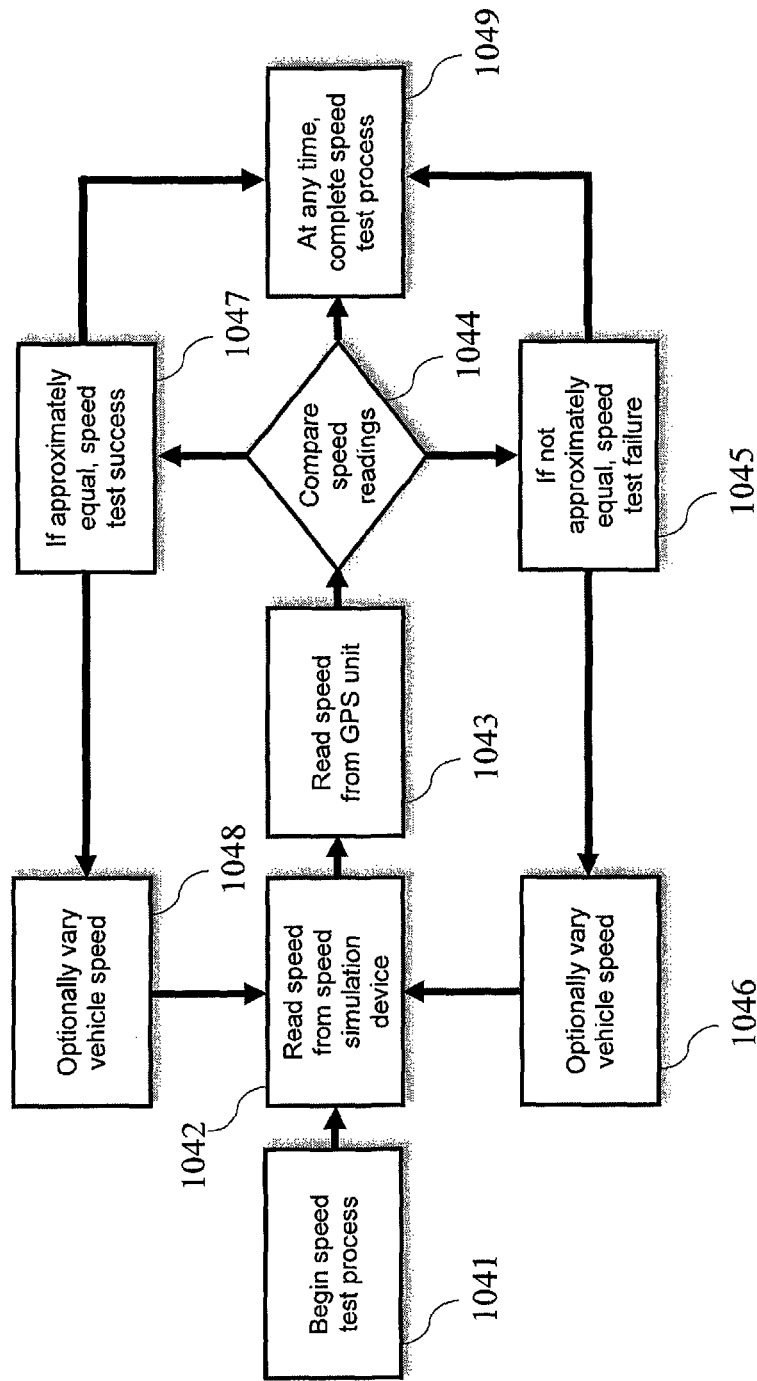
FIG. 7 is a flow diagram of a non-limiting embodiment or aspect of a vehicle speed validation method for testing a train management computer disposed on a road-rail vehicle according to the principles of the present invention.

With reference to FIG. 7, a method for testing a TMC on a road-rail vehicle is shown according to a non-limiting embodiment or aspect. If the TMC was deployed and tested on a locomotive, the TMC would receive hardware input from a locomotive speed sensor, such as a wheel speed tachometer, and compare the input to readings from a second, verification speed sensor, such as a GPS unit. In the method shown in FIG. 7, a speed sensor (e.g., a ground speed radar sensor mounted on the road-rail vehicle) takes the place of the locomotive wheel speed tachometer and simulates the speed sensor input. It will be appreciated that, as described above, other or additional sensor types may be deployed to simulate the input of a locomotive wheel speed tachometer.

With continued reference to FIG. 7, upon initiating the speed test process at step 1041, the TMC receives a first speed signal from the speed simulation device at step 1042. The TMC then receives a second speed signal from a second speed sensor, such as a GPS unit mounted on or in the road-rail vehicle that determines speed from locational changes at step 1043. Next, at step 1044, the TMC compares the two speed signals to determine if the speed signal being tested (i.e., the input from the speed simulation device) is approximately equal to the speed signal from the second speed sensor. It will be appreciated that the two speed signals may be alternatively or additionally compared by an operator or other road-rail vehicle personnel, such as by visual verification of the two speed signals as reported on an in-vehicle display. If the speed signals are not approximately equal, the speed test records the failure at step 1045, at which point the speed tests may be terminated at step 1049 to allow the TMC and/or road-rail vehicle equipment to be recalibrated. Alternatively, the operator may continue with testing, potentially varying the vehicle speed at step 1046, acquiring new speed signals at steps 1042 and 1043, and making a new comparison at step 1044. If the speed signals are approximately equal, the speed test records the success at step 1047, at which point the tests may be completed at step 1049 or, alternatively, the operator may continue with testing, potentially varying the vehicle speed at step 1048, acquiring new speed signals at steps 1042 and 1043, and making a new comparison at step 1044. At any time, the speed test process may be terminated at step 1049.

Figure 8:
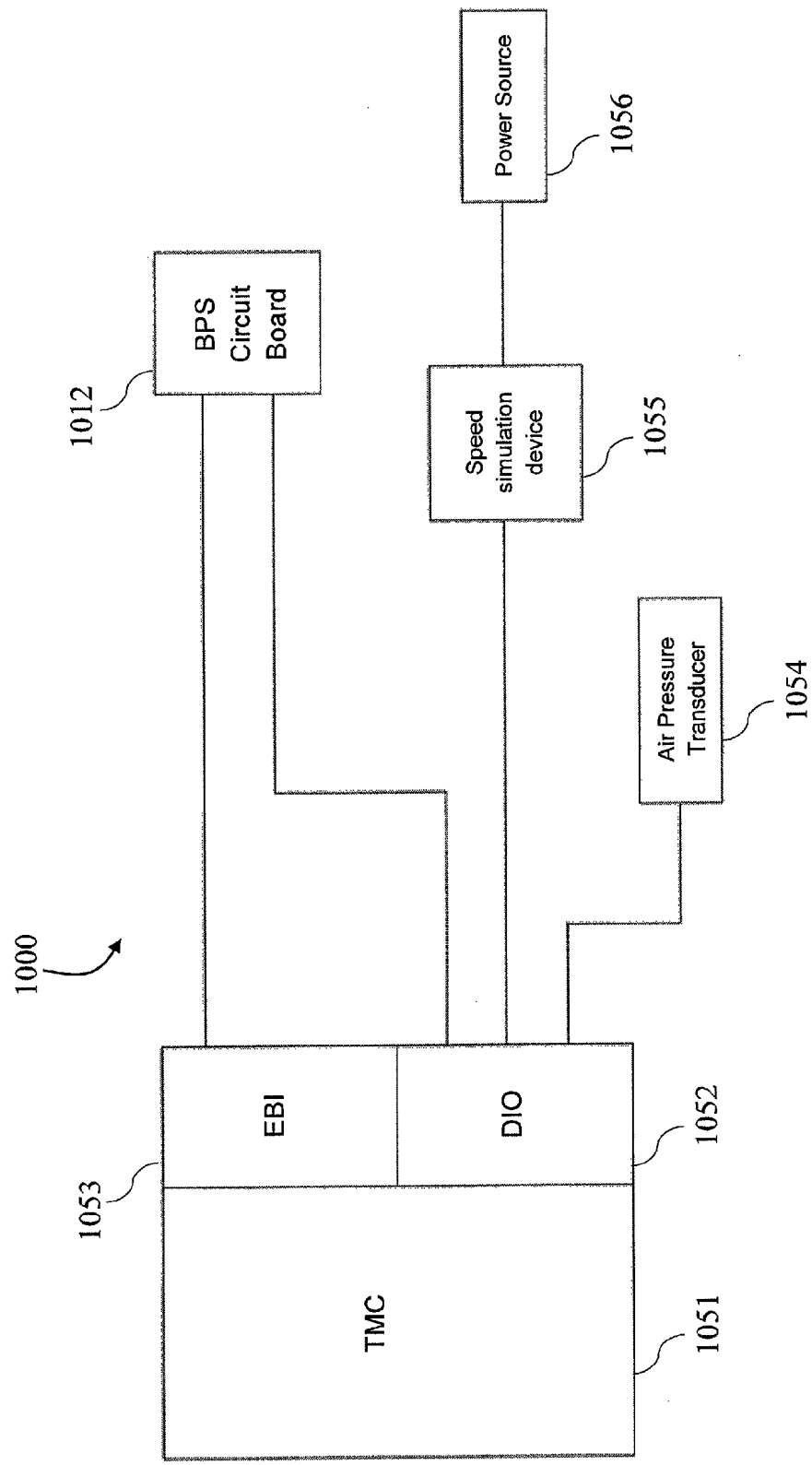
FIG. 8 is another schematic view of a non-limiting embodiment or aspect of a system for testing a train management system on a road-rail vehicle according to the principles of the present invention.

With reference to FIG. 8, provided is a schematic view of one embodiment or aspect of the communicative connections of a TMC to a brake pipe simulation device, a speed simulation device, and an air pressure transducer. In particular, depicted is a preferred and non-limiting configuration for a TMC 1051 that is communicatively connected to the road-rail vehicle simulation equipment. It will be appreciated that the simulation system and/or programming or configuration of devices are adaptable for connection to other types of on-board computers or TMCs. An example TMC 1051 may have at least three communication interfaces, including a discrete input/output (DIO) interface 1052, an electronic brake interface (EBI) 1053, and an input/output concentrator (IOC) interface. The brake pipe simulation device 1012 circuit board is configured with an input and an output interface, through which it sends signals to and receives signals from the DIO interface 1052 and EBI 1053. As shown, the DIO interface 1052 is also in communication with an air pressure transducer 1054, which is used to simulate a constant zero (0) psi locomotive vent pressure. It will be appreciated that, instead of using an actual transducer, an input from a locomotive vent pressure sensor may also be simulated. Also shown in FIG. 8 is the speed simulation device 1055, which includes a speed sensor and is connected to the DIO interface 1052 to simulate the locomotive wheel speed tachometer. An external power source 1056, such as, but not limited to, a 12 V battery with a common ground for the DIO interface 1052, may be used to provide power for the speed simulation device 1055. The external power source 1056 may include, but is not limited to, a power source disposed in a first portable enclosure described in connection with FIG. 1.

Figure 9:
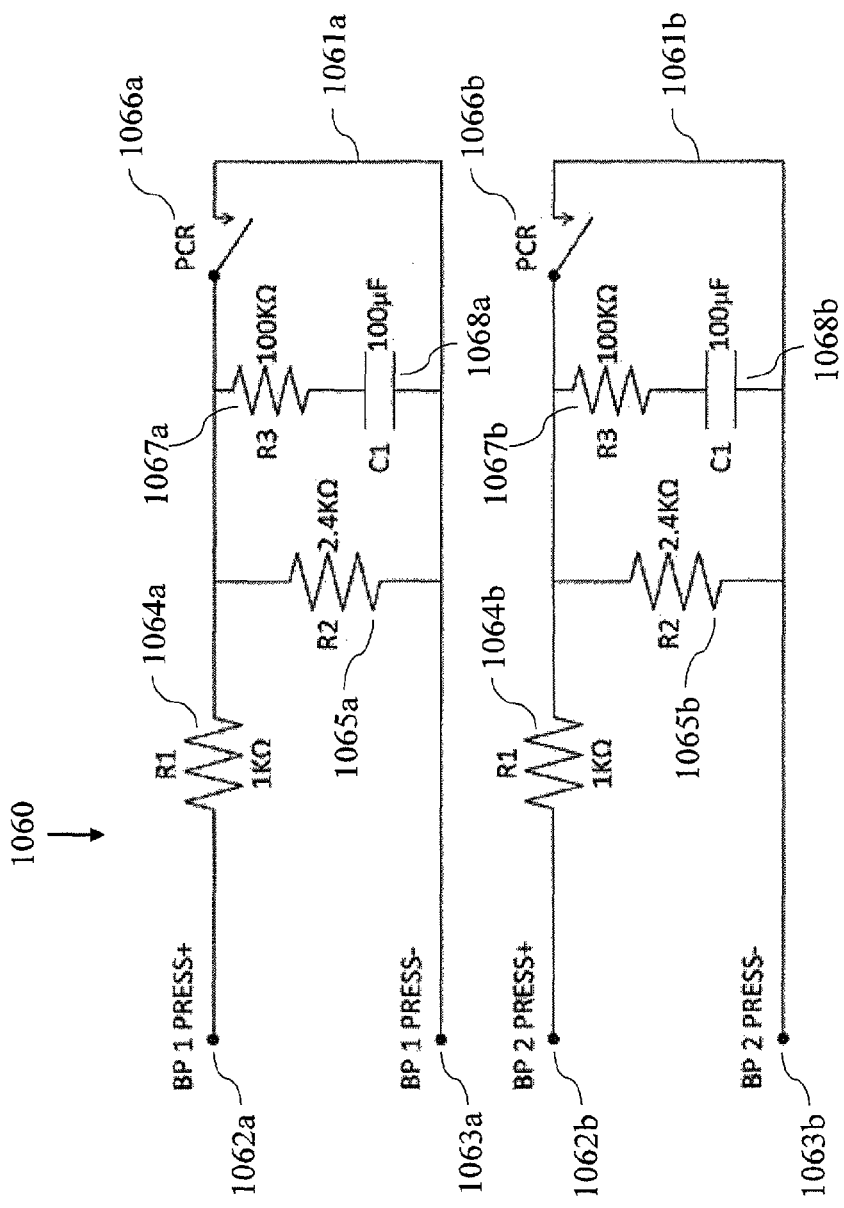
FIG. 9 is a circuit schematic of a non-limiting embodiment or aspect of a system for simulating brake pipe pressure according to the principles of the present invention.

Referring now to FIG. 9, a circuit diagram 1060 is shown for a brake pipe simulation device according to a non-limiting embodiment or aspect. Two identical circuits 1061a-b are shown for simulating two brake pipe pressure inputs. The values shown in FIG. 9 for resistance, capacitance, and voltage are preferred but non-limiting examples. However, it will be appreciated that numerous circuit configurations are possible for providing variable brake pipe pressure inputs.

With continued reference to FIG. 9, shown is a positive voltage connection 1062a-b and negative voltage connection 1063a-b for each brake pipe pressure circuit 1061a-b. Each circuit 1061a-b has a first resistor (R1) 1064 of lower resistance, e.g., 1 kΩ, which is in series with a second resistor (R2) 1066 of higher resistance, e.g., 2.4 kΩ. A third resistor (R3) 1067 of a higher resistance, e.g., 100 kΩ, and a capacitor (C1) 1068 having a capacitance, e.g., 100 µF, are in series with R1 1604 and in parallel with R2 1065. A switch 1066a-b, e.g., a pneumatic control relay (PCR), is in series with R1 1064 and in parallel with R2 1065 and R3 1067, such that when the switch 1066a-b is closed and completes the parallel circuit, R2 1065a-b and R3 1067a-b are shorted and the current flows from the positive connection 1062a-b to the negative connection 1063a-b through R1 1064a-b only. Therefore, the circuits 1061a-b exhibit variable resistance depending on whether the switch 1066a-b has been opened by a brake-application signal from the TMC. The example circuit 1061a-b in FIG. 9 has a resistance of approximately 3.3 kΩ when the switch 1066 is open, which simulates a brake pipe pressure of approximately 4 psi, which is representative of a full brake application for some trains. The example circuit 1061a-b has a resistance of approximately 1 kΩ when the switch is closed, which simulates a brake pipe pressure of approximately 90 psi, which is representative of no brake application.

Figure 10:
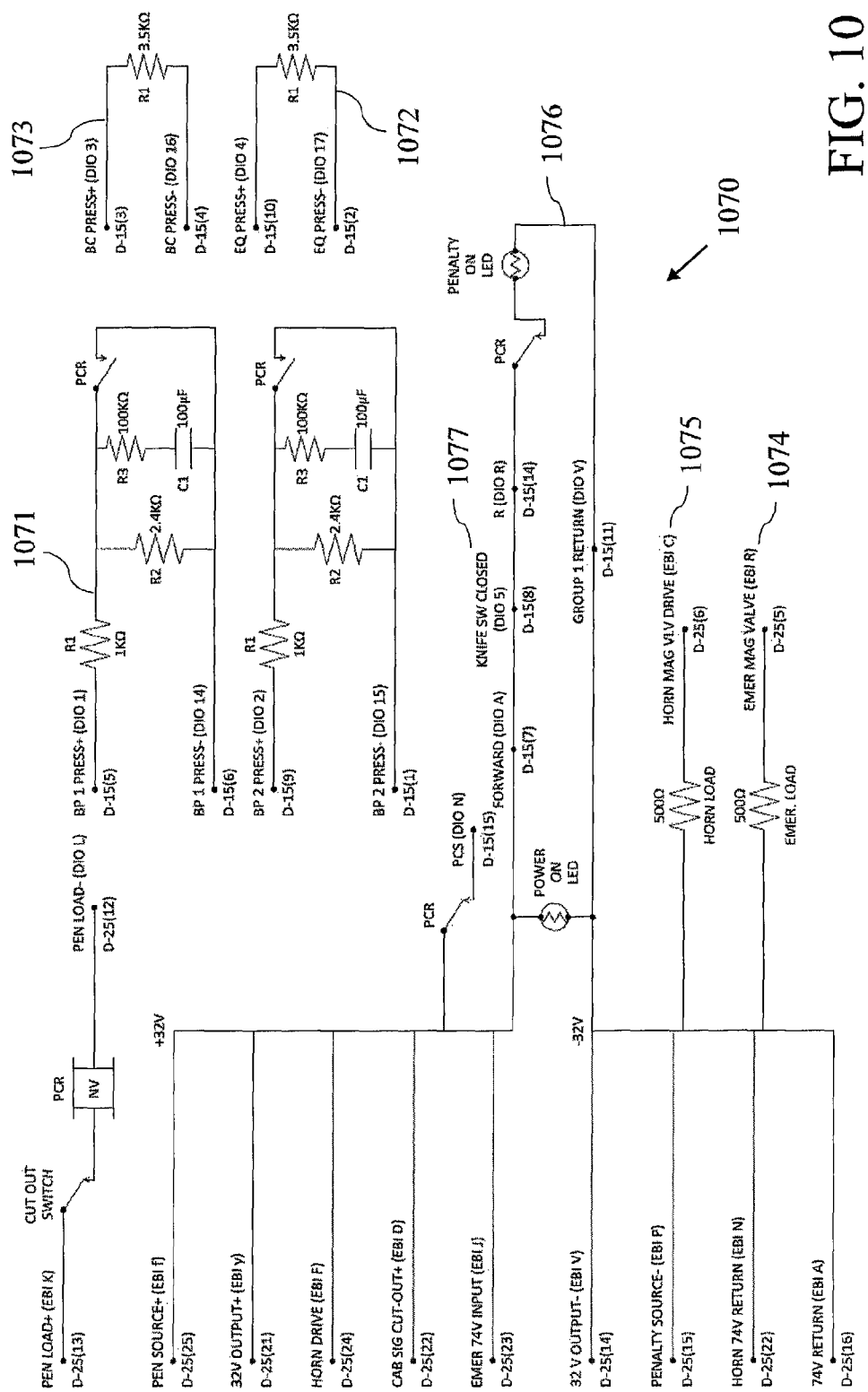
FIG. 10 is another circuit schematic of a non-limiting embodiment or aspect of a system for simulating brake pipe pressure according to the principles of the present invention.

Referring now to FIG. 10, a circuit schematic 1070 for a brake pipe simulation device is shown according to a preferred and non-limiting embodiment or aspect. The specific inputs and outputs shown correspond to a connection to an example TMC, e.g., a TMC manufactured by Wabtec Corp., although it will be appreciated that the inputs and outputs may differ based on the type of TMC used. The example brake pipe pressure simulation circuit 1071 is also shown in FIG. 9 and is configured to vary in resistance when a brake penalty relay is switched on or off. Also shown in FIG. 10 is an equalizing reservoir (EQ) pressure simulation circuit 1072, a brake cylinder (BC) pressure simulation circuit 1073, an emergency load simulation circuit 1074, a horn load simulation circuit 1075, and a system power and locomotive cab signal simulation circuit 1076. The EQ pressure and BC pressure simulation circuits 1072, 1073 are configured with a 3.5 kΩ resistor to simulate a pressure of approximately 4 psi, although various other resistors and circuit arrangements may be used to simulate a variety of pressures. The emergency load and horn load simulation circuits 1074, 1075 are configured with a 100Ω to 500Ω resistor to simulate a baseline reading of connectivity. Again, various other resistors and circuit arrangements may also be used for such simulated outputs. The system power and locomotive cab signal simulation circuit 1076 is connected to a power source which powers indicator LEDs and simulates the connections from a TMC to a locomotive cab interface. The circuit is depicted to be completed by a closed knife switch 1077, which provides a physical completion of the circuit, although various other devices and circuit arrangements may also be used.

Figure 11:
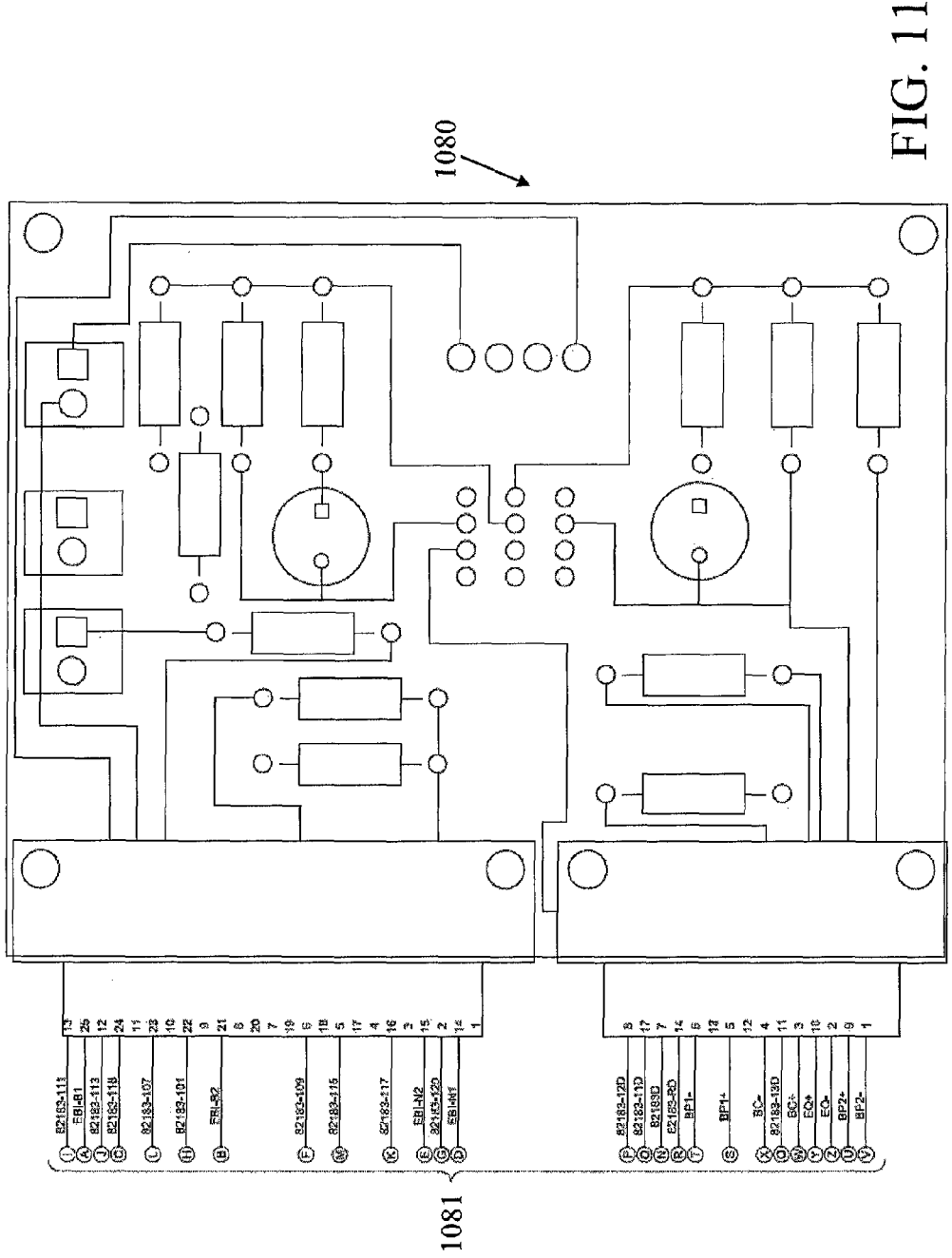
FIG. 11 is a further circuit schematic of a non-limiting embodiment or aspect of a system for simulating brake pipe pressure according to the principles of the present invention.

Referring now to FIG. 11, a circuit board schematic 1080 for a brake pipe and tachometer simulation subsystem is shown according to one preferred and non-limiting embodiment or aspect. Again, the specific inputs and outputs shown correspond to a connection to an example TMC, e.g., a TMC manufactured by Wabtec Corp., although it will be appreciated that the inputs and outputs may differ based on the type of TMC used. The circuit schematic 1070 shown in FIG. 10 can be mapped onto the circuit board schematic 1080 shown in FIG. 11, with the leftmost circuit connections 1081 corresponding to the circuit inputs and outputs (nodes) of the preceding circuit schematic 1070 (correspondence tables shown in FIG. 12). The circuit connections 1081 are labeled alphabetically to correspond to the connection tables 1090, 1091, and 1100 of FIGS. 12 and 13. The leftmost circuit connections 1081 correspond the circuit board 1080 to the connector pins of the TMC. For example, the BPS circuit board 1080 can be connected to the TMC through modified D-subminiature electrical connector cables. In one example, a DB-25 connector can be used to connect the top section of circuit connections 1081 to a cable that connects to the EBI port of the TMC. A DA-15 connector can be used to connect the bottom section of circuit connections 1081 to a cable that connects to the DIO port of the TMC. It will be appreciated that any like connector or adaptor may be used to connect the circuitry of the BPS to the TMC, and moreover, a wireless communication protocol may be used in conjunction or alternatively to communicate with the BPS inputs to the TMC.

Figure 12:
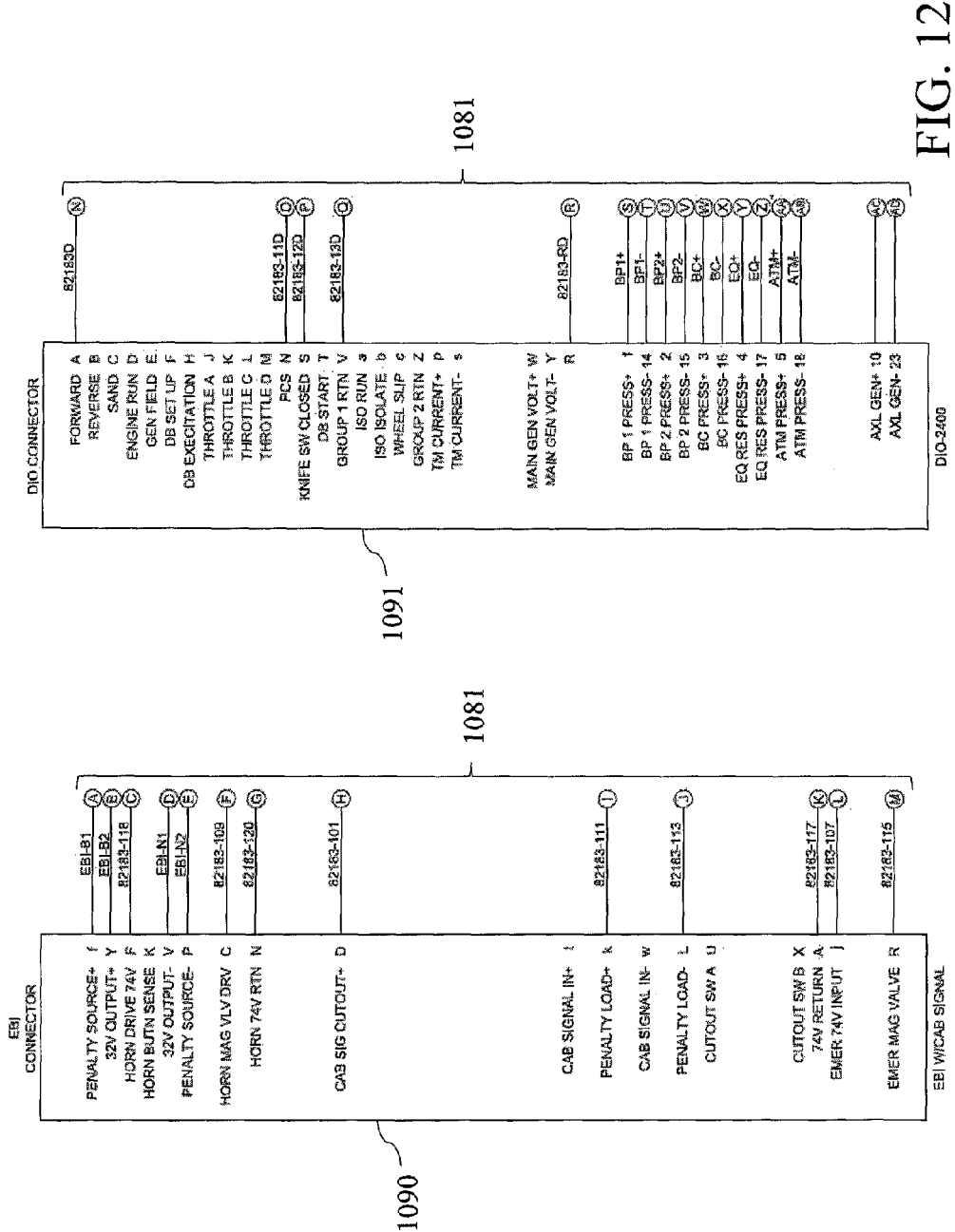
FIG. 12 is a set of schematic diagrams of input/output connections for a train management computer according to the principles of the present invention.

Referring now to FIG. 12, connection tables 1090, 1091 that map the circuit board 1080 circuit connections 1081, and circuit schematic 1070 nodes shown in FIGS. 10 and 11 to the connector pins of a TMC, are shown according to a preferred and non-limiting embodiment or aspect. In the example shown in FIG. 12, the connector pins correspond to the EBI port and DIO port of the TMC. The EBI connection table 1090 lists the names of the pins of the TMC EBI port, which correspond to the leftmost circuit connections 1081 of the BPS. The DIO connection table 1091 lists the names of the pins of the TMC's DIO port, which correspond to the leftmost circuit connections 1081 of the BPS.

Referring now to FIG. 13, in one preferred and non-limiting embodiment or aspect, provided is a connection table 1100 that maps the EBI and DIO ports of a TMC to DB-25 and DA-15 connectors that may be used to connect to the BPS circuit board 1080. The leftmost column of the connection table 1100 lists the names of the pins of the TMC EBI and DIO ports. The middle column lists the letters or numbers of the pins of the TMC EBI and DIO ports. The rightmost column lists the numbers of the pins of the DB-25 or DA-15 connectors that may be used to connect to the BPS circuit board 1080. Given that, in this non-limiting embodiment or aspect, the TMC is communicating with the BPS over a cabled connection with varying connectors on either end, it is necessary to use a modified cable, or modify an existing cable, to connect the two devices. It will be appreciated that the communication between the TMC and the BPS may be accomplished by other means, including, but not limited to, a wireless communication protocol.

Figure 14B:
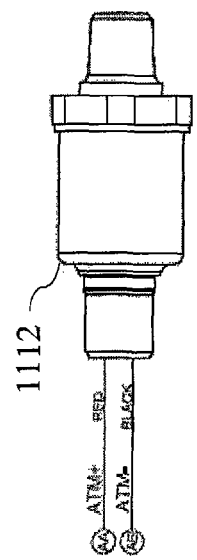
FIG. 14B is a pressure transducer for a system for testing a train management computer on a road-rail vehicle according to the principles of the present invention.
Figure 14A:
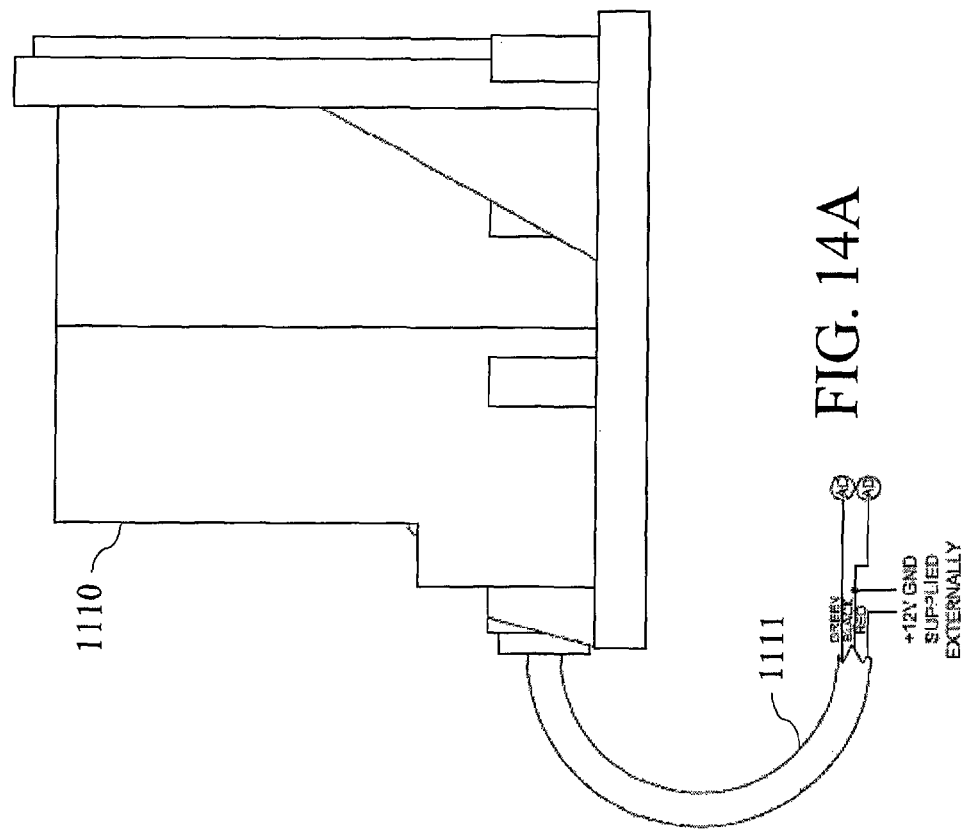
FIG. 14A is a radar sensor for a system for testing a train management computer on a road-rail vehicle according to the principles of the present invention.

With specific reference to FIGS. 14A and 14B, shown are two devices for simulating locomotive inputs for a road-rail vehicle equipped with a TMC according to a preferred and non-limiting embodiment or aspect. FIG. 14A depicts a ground speed radar 1110, such as, but not limited to, a DICKEY john Radar III, that can be mounted in or on a road-rail vehicle. One preferred but non-limiting location for mounting the ground speed radar 1110 is the rear tail hitch of the road-rail vehicle, although other arrangements are also possible. The ground speed radar 1110 is used to convert the ground speed of the road-rail vehicle to an electronic output signal that simulates the output of a tachometer of a locomotive. Other speed sensors, transducers, and/or signal converters may be used to convert the speed of the road-rail vehicle to a simulated signal for the TMC. FIG. 14B depicts an air pressure transducer 1112 according to a preferred and non-limiting embodiment or aspect. The air pressure transducer 1112 can be connected to the TMC to simulate a vent pipe pressure of zero, allowing the TMC to complete initialization or other processes that require a locomotive vent pipe pressure of zero. It will be appreciated that other simulation devices may be used to mimic the hardware outputs of a locomotive.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A simulation system for testing a train management system comprising a train management computer on a road-rail vehicle, the simulation system comprising:
    a brake pressure simulation circuit adapted to be connected to a first input of the train management computer, the brake pressure simulation circuit comprising at least one circuit programmed or configured to output signals representative of at least one brake pipe pressure; and
    a speed simulation circuit adapted to be connected to a second input of the train management computer, the speed simulation circuit programmed or configured to detect a speed of the road-rail vehicle and output signals representative of the speed.

2. The simulation system of claim 1, wherein the at least one circuit has a variable resistance such that the signals representative of the at least one brake pipe pressure comprise at least two resistances.

3. The simulation system of claim 2, wherein the brake pressure simulation circuit comprises an input interface adapted to receive output signals from the train management computer, and wherein the at least one circuit is programmed or configured to change in resistance based at least partially on the output signals.

4. The simulation system of claim 3, wherein the resistance of the at least one circuit is programmed or configured to switch between a higher-level resistance and a lower-level resistance, wherein the higher-level resistance is representative of a lower-level brake pipe pressure that occurs during brake application, and wherein the lower-level resistance is representative of a higher-level brake pipe pressure that occurs during brake release.

5. The simulation system of claim 1, wherein the speed simulation circuit comprises a radar speed sensor.

6. The simulation system of claim 1, wherein the speed simulation circuit comprises a wheel speed tachometer for the road-rail vehicle.

7. The simulation system of claim 1, wherein the speed simulation circuit comprises a signal converter programmed or configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

8. The simulation system of claim 1, wherein the first input comprises an electronic brake interface.

9. The simulation system of claim 1, wherein the first input comprises a discrete input/output interface.

10. The simulation system of claim 8, wherein the second input comprises a discrete input/output interface.

11. The simulation system of claim 1, wherein the speed simulation circuit is programmed or configured to detect a speed of the road-rail vehicle by detecting a speed of a ground surface relative to the road-rail vehicle as the road-rail vehicle is moving.

12. The simulation system of claim 11, wherein the speed simulation circuit is programmed or configured to produce a pulsing signal wave simulative of the output of a wheel speed tachometer, wherein the signal's pulse rate changes in relation to the road-rail vehicle's ground speed.

13. The simulation system of claim 1, further comprising a vent pressure simulation device, the vent pressure simulation device comprising an air pressure transducer configured to output a signal representative of a zero pressure.

14. A simulation device for testing a train management system on a road-rail vehicle, the simulation device comprising:
    at least one first interface adapted to be connected to a brake system input of a train management computer;
    at least one second interface adapted to be connected to a speed input of the train management computer;
    a brake pressure simulation circuit programmed or configured to generate and output at least one brake pressure signal through the at least one first interface; and
    a speed simulation circuit programmed or configured to output at least one speed signal through the at least one second interface, the at least one speed signal corresponding to a speed of the road-rail vehicle.

15. The simulation device of claim 14, wherein the speed simulation circuit comprises:
   at least one speed sensor configured to detect the speed of the road-rail vehicle; and
   at least one circuit or processor programmed or configured to convert at least one signal received from the at least one speed sensor to the at least one speed signal.

16. The simulation device of claim 14, wherein the speed simulation circuit is a signal converter programmed or configured to be connected to a vehicle data interface of the road-rail vehicle, the signal converter being further programmed or configured to convert the road-rail vehicle's speed output to a signal representative of a locomotive's speed output and wirelessly communicate the signal to the train management computer.

17. The simulation device of claim 14, wherein the speed simulation circuit is programmed or configured to generate at least one speed signal based at least partially on the speed of the road-rail vehicle.

18. The simulation device of claim 17, wherein the speed simulation sensor is a ground speed radar.

19. The simulation device of claim 17, wherein the speed simulation sensor is a wheel speed tachometer for the road-rail vehicle.

20. A method for testing a train management system comprising a train management computer on a road-rail vehicle, the method comprising:
   generating, with at least one circuit, at least one brake pressure signal based at least partially on at least one signal received from the train management computer;
   outputting the at least one brake pressure signal to an input of the train management computer;
   detecting at least one speed of the road-rail vehicle while the road-rail vehicle is moving;
   generating at least one speed signal based at least partially on the at least one speed of the road-rail vehicle; and
   outputting the at least one speed signal to the train management computer.

21. The method of claim 20, further comprising:
   varying the at least one brake pressure signal by varying the resistance of the at least one circuit, at least partially in response to the input of the train management computer.

22. The method of claim 21, wherein the resistance of the at least one circuit is configured to switch between a higher-level resistance, representative of a lower-level brake pipe pressure that occurs during brake application, and a lower-level resistance, representative of a higher-level brake pipe pressure that occurs during brake release.

* * * * *